(12) United States Patent
Midtun et al.

(10) Patent No.: US 12,040,657 B2
(45) Date of Patent: Jul. 16, 2024

(54) UNINTERRUPTIBLE POWER SUPPLY ARRANGEMENT FOR SUBSEA APPLICATIONS

(71) Applicant: ABB Schweiz AG, Baden (CH)

(72) Inventors: Paul Midtun, Bergen (NO); John Pretlove, Sandvika (NO); Nicola Notari, Gentilino (CH); Silvio Colombi, Losone (CH); Helge Kolstad, Oslo (NO); Paolo Catapane, Minusio (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/245,831

(22) PCT Filed: Sep. 13, 2021

(86) PCT No.: PCT/EP2021/075096
§ 371 (c)(1),
(2) Date: Mar. 17, 2023

(87) PCT Pub. No.: WO2022/058279
PCT Pub. Date: Mar. 24, 2022

(65) Prior Publication Data
US 2023/0261514 A1    Aug. 17, 2023

(30) Foreign Application Priority Data
Sep. 18, 2020    (EP) .................... 20196926

(51) Int. Cl.
*H02J 9/06*      (2006.01)
*B63J 3/04*      (2006.01)

(52) U.S. Cl.
CPC ............... *H02J 9/061* (2013.01); *B63J 3/04* (2013.01); *H02J 9/068* (2020.01); *H02J 2310/42* (2020.01)

(58) Field of Classification Search
CPC .... H02J 9/00; H02J 9/061; H02J 9/062; H02J 9/068; H02J 2310/42; H05K 7/14325
See application file for complete search history.

(56) References Cited

U.S. PATENT DOCUMENTS 7,379,305 B2 * 5/2008 Briggs ..................... H05K 7/18
361/727
10,432,017 B1 * 10/2019 Morales .............. H02J 7/00712
(Continued)

FOREIGN PATENT DOCUMENTS

CN    106489224 A    3/2017
CN    106849326 A    6/2017
(Continued)

OTHER PUBLICATIONS

Roberts Bradford, Energy Storage Applications for Large Scale Power Protection Systems (Year: 2001).*
(Continued)

*Primary Examiner* — Rexford N Barnie
*Assistant Examiner* — Rasem Mourad
(74) *Attorney, Agent, or Firm* — Whitmyer IP Group LLC

(57) ABSTRACT

An uninterruptible power supply, UPS, arrangement for subsea applications, including a container arranged and configured for subsea operation, and the following main modules arranged inside the container: at least one battery module of a predetermined battery capacity; at least one UPS module governing the battery module, the UPS module having a predetermined UPS capacity; at least one control module configured for interfacing and managing the battery module and the UPS module. The UPS arrangement is arranged and configured to vary its overall capacity based on at least the number of battery and UPS modules, wherein the at least one battery module and the at least one UPS module (Continued)

are internally arranged such that the heat losses from the UPS module are used to heat the battery module.

21 Claims, 3 Drawing Sheets

(56) References Cited

U.S. PATENT DOCUMENTS

| | | | | |
|---|---|---|---|---|
| 2001/0011845 A1* | 8/2001 | Simonelli | ............... | H02J 9/062 |
| | | | | 307/66 |
| 2013/0330578 A1* | 12/2013 | Domel | ................... | B60H 1/143 |
| | | | | 429/50 |
| 2017/0085121 A1* | 3/2017 | Cairoli | .................... | H02J 9/061 |
| 2018/0316215 A1* | 11/2018 | Lu | ......................... | H05K 7/1492 |
| 2020/0076200 A1* | 3/2020 | Ballantine | ................. | H02J 9/06 |
| 2020/0259227 A1* | 8/2020 | Salonen | ............ | H01M 10/6553 |

FOREIGN PATENT DOCUMENTS

| | | | | |
|---|---|---|---|---|
| CN | 111244577 A | 6/2020 | | |
| EP | 3249731 A1 | 11/2017 | | |
| JP | H0624238 A | 2/1994 | | |
| WO | 2007055587 A1 | 5/2007 | | |
| WO | WO-2007055587 A1 * | 5/2007 | ......... | E21B 33/0385 |
| WO | WO-2016083177 A1 * | 6/2016 | | |

OTHER PUBLICATIONS

Greig, A., et al.; "Subsea Uninterruptible Power Supplies (UPS) for Local Holdup of Magnetic Levitating Bearings in Subsea Production Hardware"; Offshore Technology Conference; Houston, Texas, USA; May 6, 2013; 9 Pages.

Ho, Anthony, K., P.E.; "Introduction to Subsea Engineering for Electrical Engineers"; 2017 PDH Online/PDH Center; Fairfax, VA., USA; PDHonline Course E443; 49 Pages.

Extended European Search Report; Application No. 20196926.8; Completed: Jan. 25, 2021; Issued: Feb. 3, 2021; 9 Pages.

PCT International Search Report and Written Opinion of the International Searching Authority; Application No. PCT/EP2021/075096; Completed: Nov. 22, 2021; Mailing Date: Dec. 2, 2021; 14 Pages.

Roberts, Bradford P., P.E.; "Energy storage applications for large scale power protection systems"; 2001 IEEE/PES Transmission and Distribution Conference and Exposition, vol. 2; Atlanta, GA, USA and New York, NY, USA; IEEE; Oct. 28, 2001 and Nov. 2, 2021; 4 Pages.

Chinese Office Action; Application No. 2021800639691; Issued: Jul. 18, 2023; 3 Pages.

Korean Office Action; Application No. 10-2023-7012770; Issued: Jul. 21, 2023; 3 Pages.

* cited by examiner

UNINTERRUPTIBLE POWER SUPPLY ARRANGEMENT FOR SUBSEA APPLICATIONS

TECHNICAL FIELD

The present invention relates generally to uninterruptible power supply, UPS. The invention more particularly relates to an UPS arrangement for subsea applications and to power supply system comprising a UPS arrangement.

BACKGROUND

Subsea power grids are installed for supplying electric power to subsea applications e.g. compressors used for compressing gas along the seabed, e.g. at a water depth of 3000 m. A subsea power grid may include transformers, switchgear, variable speed drives (VSDs), and uninterruptible power supply (UPS). A UPS is specifically advantageous when the subsea power grid is to be used to supply a critical load e.g. requiring backup power to safely shutdown the process if needed. Such critical load may e.g. be a control system, electric actuators or compressor active magnetic bearings.

The UPS or UPS arrangement may be a subsea UPS arrangement operating at the seabed. This typically save costs as the UPS can be fed with electric power from a subsea main power supply of the subsea power grid, and cables for the UPS need not to extend to a top side, or on shore UPS. Moreover, by arranging the UPS close to the corresponding load, power loss and load dependent voltage variations due to voltage drop in a long cable can be minimized. The subsea UPS arrangement typically includes batteries and control system housed in a pressure compensated container for providing a more desirable operating environment. An example of such UPS arrangement for subsea applications is given in WO 2007/055587.

However, adaptations, modifications and an extensive subsea qualification program of the subsea UPS in response to the subsea environment, as e.g. the pressure compensated container, lead to higher equipment costs. This, together with the relatively few installations of subsea UPS worldwide, call for a need in making the subsea UPS arrangement more efficient and cost effective.

SUMMARY

An object of the present invention is to overcome at least some of the above problems, and to provide an UPS arrangement which, at least to some extent, is improved compared to prior art solutions. This, and other objectives, which will become apparent in the following are accomplished by means of a UPS arrangement for subsea applications, and a power supply system comprising a UPS arrangement and a main power supply.

According to a first aspect of the present invention, an uninterruptible power supply, UPS, arrangement for subsea applications is provided. The UPS arrangement comprises:
- a container arranged and configured for subsea operation, and
- the following main modules arranged inside said container:
  - at least one battery module of a predetermined battery capacity,
  - at least one UPS module governing the battery module, the UPS module having a predetermined UPS capacity,
  - at least one control module configured to control the operation of the battery module and the UPS module, wherein the UPS arrangement is arranged and configured to vary its overall capacity based on at least the number of battery and UPS modules.

Hereby, an improved UPS arrangement compared to prior art solutions is provided, as the overall capacity of the UPS arrangement is easily adapted based on the number of battery modules and UPS modules. For example, the combined number battery modules and UPS modules are at least three. Thus, the overall capacity of the UPS arrangement may be varied by having at least one battery module and at least one or at least two UPS modules, or having at least two battery modules and at least one UPS module. For redundancy of the battery and UPS modules, at least two battery modules and at least two UPS modules are provided inside the container.

By providing an easy adaptation of the overall capacity of the UPS arrangement, at least the manufacturing process for various UPS arrangement is simplified. Moreover, qualification and testing can be simplified as the same type of main modules are used for different overall capacity of the UPS arrangement. That is, the same principal configuration (and possibly even the same container) can be used for manufacturing UPS arrangement of different overall capacity. I other words, the UPS arrangement can be scaled up or down based on the desired need of overall capacity of the UPS arrangement, using the same main modules, the scaling being based on at least the combined number of battery and UPS modules.

According to at least one example embodiment, the main modules comprises at least two battery modules and at least two UPS modules. According to at least one example embodiment, the main modules comprises a plurality of battery modules and/or a plurality of UPS modules, the plurality being more than two.

According to at least one example embodiment, the main modules are set up in discrete functional groups, each discrete functional group comprising at least one control module, at least one UPS module and at least one battery module, wherein the UPS arrangement is arranged and configured to vary its overall capacity based on the number of functional groups.

Hereby, an advantageous measure of, or technical means for, varying the overall capacity of the UPS arrangement is provided. Each discrete functional group may have its own discrete capacity, the sum of the discrete capacities being the overall capacity of the UPS arrangement. According to at least one example embodiment, the discrete capacity of at least two discrete functional groups are different to each other.

According to at least one example embodiment, at least one battery module, at least one UPS module, or at least one control module is shared between at least two functional groups.

Hereby, an efficient use of the main modules is provided. For example, a control module may be shared by at least two functional groups, and thus control the operation of at least two different battery-UPS module groups.

According to at least one example embodiment, the battery module is physically separated from the UPS module, and may be varied in number separately of each other.

In case of more than one battery module and/or UPS module, each one of the battery modules is typically physically separated from the UPS module. Thus, the battery module(s) and the UPS module(s) may be separately controlled, and separately arranged inside the container.

According to at least one example embodiment, the battery module(s) and the UPS module(s) are comprised in a respective canister, e.g. a steel canister or steel tube. Each canister is typically arranged and configured to withstand subsea environment and may be filled with gas, e.g. N2. Alternatively, the container is a pressure compensated container (to correspond to the pressure outside of the container) filled with a dielectric liquid, e.g. oil, wherein the battery module(s) and UPS module(s) will be subject to the pressure inside the container.

According to at least one example embodiment, the number of battery modules are different to the number of UPS modules.

Hereby, a single module of the battery module or UPS module may support another UPS module or battery module, respectively, thus making efficient use of the battery and UPS modules. For such embodiments, the combined number of battery and UPS modules are at least three.

According to at least one example embodiment, the overall capacity of the UPS arrangement is a UPS-battery capacity being the result of the combined battery capacity of the battery module or battery modules and the UPS capacity of the UPS module or UPS modules.

Thus, each battery module has a battery capacity, and each UPS module has a UPS capacity (e.g. being related to the number of battery modules, or battery capacity, being able to handle), wherein the combined capacity of theses two types of modules results in a UPS-battery capacity of the UPS arrangement.

According to at least one example embodiment, the UPS arrangement is arranged and configured to further vary its overall capacity based on at least the number control modules.

Thus, each control module has control capacity (e.g. related to the number of battery modules and UPS modules being able to handle), which control capacity is included in the overall capacity of the UPS arrangement.

According to at least one example embodiment, the at least one battery module and the at least one UPS module are internally arranged such that the heat losses from the UPS module are used to heat the battery module.

Hereby, an efficient use of energy is provided, and/or a more desired ambient temperature of the battery module(s) is provided. Thus, an external heating arrangement of the battery module may be reduced or even omitted. For example, the at least one battery module is internally arranged adjacent the at least one UPS module, such that the heat from the heat losses from the at least one UPS module is convectively and/or conductively transferred to the at least one battery module. Alternatively, the UPS arrangement comprises a separate heat transfer arrangement configured to transfer the heat from the heat losses from the at least one UPS module to the at least one battery module. For embodiments with at least three battery and UPS modules, the modules are arranged to optimize the heat transfer from the UPS module(s) to the battery module(s). For example, the battery module(s) may be arranged to at least partly enclose the UPS module(s).

According to at least one example embodiment, each one of the battery modules comprise a Li-Ion battery. Such batteries are preferably heated when operating at sea bottom temperature (0-4° C.), wherein the arrangement for utilizing the heat losses from the UPS module(s) are particularly advantageous.

According to at least one example embodiment, the container comprises an outer enclosure forming an inner space housing at least the main modules, wherein the outer enclosure is adaptable to vary the size of the inner space.

Hereby, an easy and yet effective means for providing the possibility to scale up or down the UPS arrangement by varying the number of at least some of the main modules is provided. The container may e.g. be built up by sections of a predetermined size, wherein the number of sections determine the size of the inner space. Thus, if a larger inner space is needed, more sections is included in the container, and if a smaller inner space is needed, less sections is included in the container. For example, the size of the inner space is varied along a lengthwise direction of the container. In other words, the height of the container may be kept constant while the size of the inner space is varied.

According to at least one example embodiment, the container is a standardized container.

Thus, the container may be made in predetermined size(s). According to at least one example embodiment, the container is qualified for subsea applications (e.g. a water depth down to 3000 m) for a various of sizes, or the container comprising the adaptable outer enclosure is qualified for subsea applications.

According to at least one example embodiment, the main modules are qualified and/or standardized modules. Thus, each of the main module may be qualified for subsea applications (e.g. a water depth down to 3000 m) and/or be made of a predetermined size.

According to at least one example embodiment, the UPS arrangement is being arranged and configured to be connected in series with a main power supply and a load powered by the main power supply.

Hereby, the UPS arrangement may quickly and directly compensate for any power loss in the main power supply. Moreover, by having the UPS arrangement connected in series with the main power supply and the load (i.e. by being arranged in between the main power supply and the load), at least a part of the electric energy is transferred via the UPS arrangement, and the battery or batteries within the battery module(s) may be charged.

According to at least one example embodiment, the UPS arrangement is being arranged and configured to be connected in parallel with a main power supply in relation to a load powered by the main power supply.

According to at least one example embodiment, the UPS arrangement further comprises input and/or output power transformer(s).

The configuration of the input and output power transformers is preferably adapted based on the intended use of the UPS arrangement. For example, the input power transformer is arranged and configured to receive power from a power supply, such as e.g. a main power supply, and the output power transformer is arranged and configured to transmit power to the load.

According to at least one example embodiment, the at least one UPS module comprises power circuitry including protection and disconnection functionality.

Hereby, a UPS module may be disconnected in case of internal failure. Each UPS module may further comprise all necessary power, interface and control functions required for supplying power to the load.

According to at least one example embodiment, the at least one battery module comprises power circuitry including protection and disconnection functionality.

Hereby, a battery module may be disconnected in case of internal failure. Each battery module may further comprise battery cells and BMS required for a standalone battery module or battery energy storage.

According to at least one example embodiment, the at least one control module comprises all necessary power, control, protection and disconnection functionality required for interfacing and managing the UPS module(s) and the battery module(s).

According to a second aspect of the present invention, a power supply system comprising a UPS arrangement according to the first aspect of the invention, and a main power supply connectable to a load, is provided.

Effects and features of the second aspect of the invention are largely analogous to those described above in connection with the first aspect of the invention, at least with reference to the UPS arrangement. Embodiments mentioned in relation to the first aspect of the invention are largely compatible with the second aspect of the invention, of which some are exemplified below.

According to at least one example embodiment, the UPS arrangement and the main power supply are connected in series such that the UPS arrangement, in use, is at least partly transferring electrical energy from the main power supply to the load.

According to at least one example embodiment, the UPS arrangement is arranged and configured, in use, to use at least a part of the transferred electrical energy to charge the battery module(s).

According to at least one example embodiment, the UPS arrangement and the main power supply are connected in parallel in relation to the load.

Any standard or qualifications mentioned in the present application are to be based on instructions valid on the date of priority of the present application. Further advantages and features of the present invention are disclosed and discussed in the following description and the accompanying drawings.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION OF DRAWINGS

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
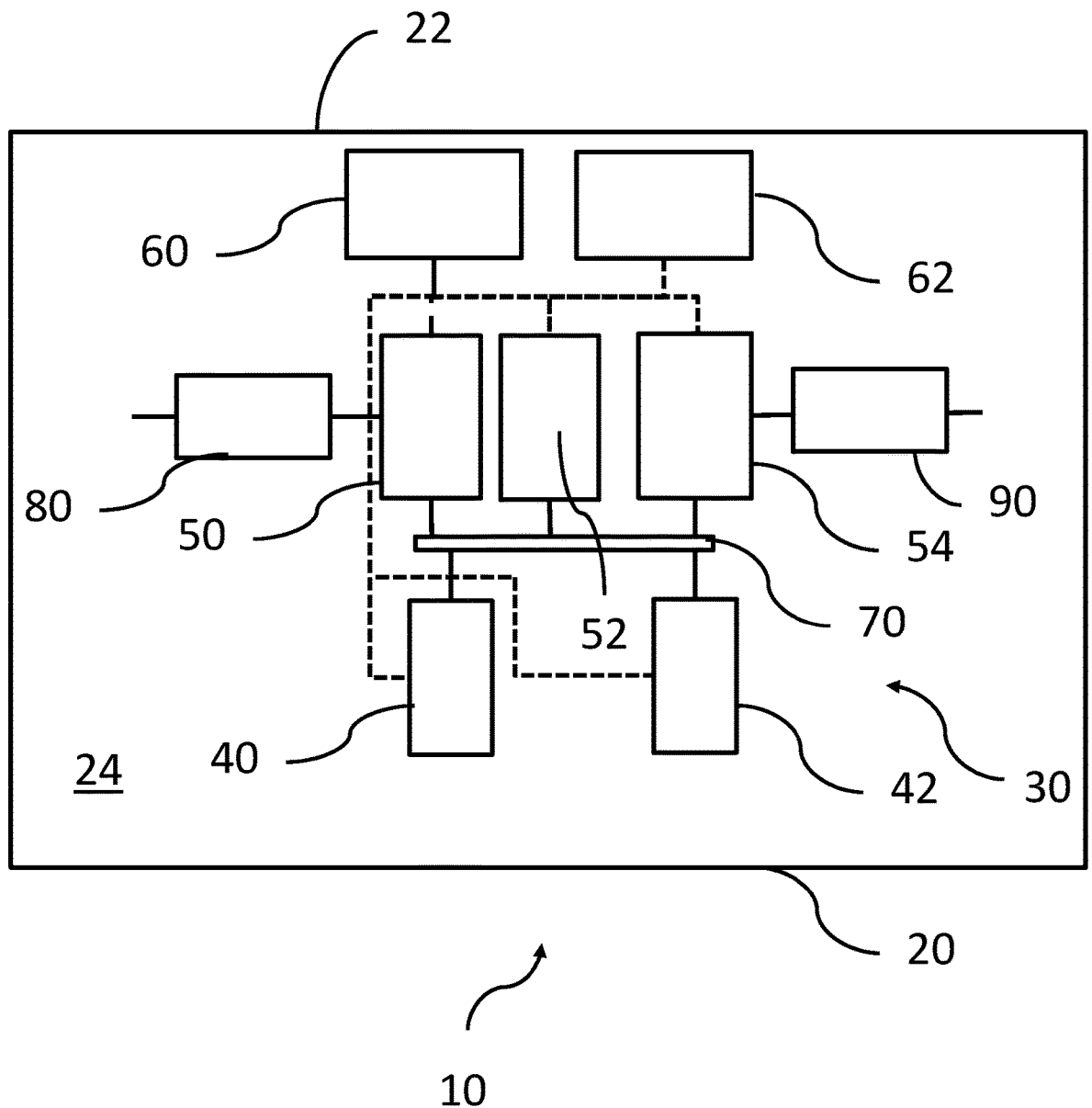
FIG. 1 schematically illustrates an UPS arrangement in accordance with at least one embodiment of the invention.

FIG. 1 schematically shows an uninterruptible power supply arrangement 10 for subsea applications. The term uninterruptible power supply will from here on being abbreviated UPS. The UPS arrangement 10 comprises a container 20, here schematically illustrated as an enclosing box 20, and three different types of main modules 30 housed or enclosed in the container 20. The three types of the main modules 30 are a first type being a battery module, a second type being an UPS module, and a third type being a control module. In the particular example of FIG. 1, the UPS arrangement 10 comprises a first battery module 40 and a second battery module 42 (commonly referred to as the battery modules 40,42), a first UPS module 50, a second UPS module 52 and a third UPS module 54 (commonly referred to as the UPS modules 50, 52, 54), and a first control module 60 and a second control module 62 (commonly referred to as the control modules 60,62). Each one of the battery modules 40, 42 has a predetermined battery capacity, and each one of the UPS modules 50, 52, 54 has a predetermined UPS capacity related to the governing of the battery module(s) 40, 42. For this purpose, each UPS module is typically equipped with associated power circuitry including e.g. components for protection and connection/disconnection possibilities. Moreover, the UPS arrangement 10 comprises input power transformer 80 and output power transformer 90 for adequately transforming and transferring electrical energy from a main power supply to a load, respectively (as further shown in FIGS. 3A and 3B).

As also shown in FIG. 1, the battery modules 40, 42 are physically separated from the UPS modules 50, 52, 54, preferably by that each of the battery and UPS modules 40, 42, 50, 52, 54 is being contained in a canister, e.g. a steel canister or steel tube. Moreover, in FIG. 1, the number of battery modules 40, 42 is different to the number of UPS modules 50, 52, 54. In the embodiment of FIG. 1, the battery modules 40, 42 are electrically connected to a bridge 70, to which each one of the UPS modules 50, 52, 54 are also connected. The battery modules 40, 42 and the UPS modules 50, 52, 54 are arranged adjacent to each other in the container 20, such that the heat losses from the UPS modules 50, 52, 54 are used to heat the battery modules 40, 42. Hereby, the ambient temperature of the battery modules 40, 42 may be brought into a more favorable condition with regards to the operation of the battery modules 40, 42. It should be noted that the battery modules 40, 42 and the UPS modules 50, 52, 54 need not to be arranged adjacent to each other in the container 20, for transporting heat from the UPS modules 50, 52, 54 to the battery modules 40, 42, but that a separate heat transfer arrangement may be provided for this purpose.

As shown in FIG. 1, the first and second control modules 60, 62 are communicatively connected to the UPS modules 50, 52, 54 and battery modules 40, 42 for controlling the operation of, e.g. interfacing and managing, the battery modules 40, 42 and the UPS modules 50, 52, 54. In more detail, the UPS arrangement 10 is built up of discrete functional groups of the main modules 30, each functional group comprising at least one control module 60, 62, at least one UPS module 50, 52, 54 and at least one battery module 40, 42. It should be noted that a particular module of the main modules 30 may be comprised in more than one discrete functional group (i.e. may be shared between the discrete functional groups). The number of discrete functional groups may be adapted based on the desired overall capacity of the UPS arrangement 10, and thus the total numbers of the main modules 30 in the UPS arrangement 10 may be varied. Stated differently, the UPS arrangement 10 is configured to vary its overall capacity based on at least the number of battery modules 40, 42 and UPS modules 50, 52,

54. In more detail, the UPS arrangement 10 has an overall capacity being a UPS-battery capacity which is the result of the combined capacities of the battery modules 40, 42 and the UPS modules 50, 52, 54, i.e. the combination of the combined battery capacity of the battery modules 40, 42 and the combined UPS capacity of the UPS modules 50, 52, 54. Additionality, the UPS arrangement 10 may be further arranged and configured to vary its overall capacity based on at least the number control modules 60, 62.

For example, a first discrete functional group may consist of the first battery module 40, the first and second UPS modules 50, 52, and the first control module 60, and a second discrete functional group may consist of the second battery module 42, the third UPS module 54 and the second control module 62. Thus, the UPS arrangement 10 may be scaled down by removing the second discrete functional group, resulting a fully functional scaled down UPS arrangement based solely on the first discrete functional group. Correspondingly, the UPS arrangement 10 may be scaled up by including a third discrete functional group comprising e.g. a fourth UPS module and third battery module (while still making use of the first or second control module 60, 62 as control module in the third discrete functional group).

The container 20, only shown schematically in FIG. 1, comprises an outer enclosure 22 forming an inner space 24 in which at least the main modules 30 are housed. The input and output power transformer 80, 90 may as well be housed in the inner space 24 with only the respective outer connectors extending outside of the outer enclosure 22, or alternatively the input and output power transformer 80, 90 are arranged outside of the inner space 24, with inner connectors extending inside the inner space 24 through the outer enclosure 22. In order vary the number of main modules 30, or at least the number of battery modules and UPS modules, as described previously, the outer enclosure 22 is adaptable to vary the size of the inner space 24. For example, the outer enclosure 22 may be made longer as more main modules 30 (or discrete functional groups) are added to the UPS arrangement.

Figure 2:
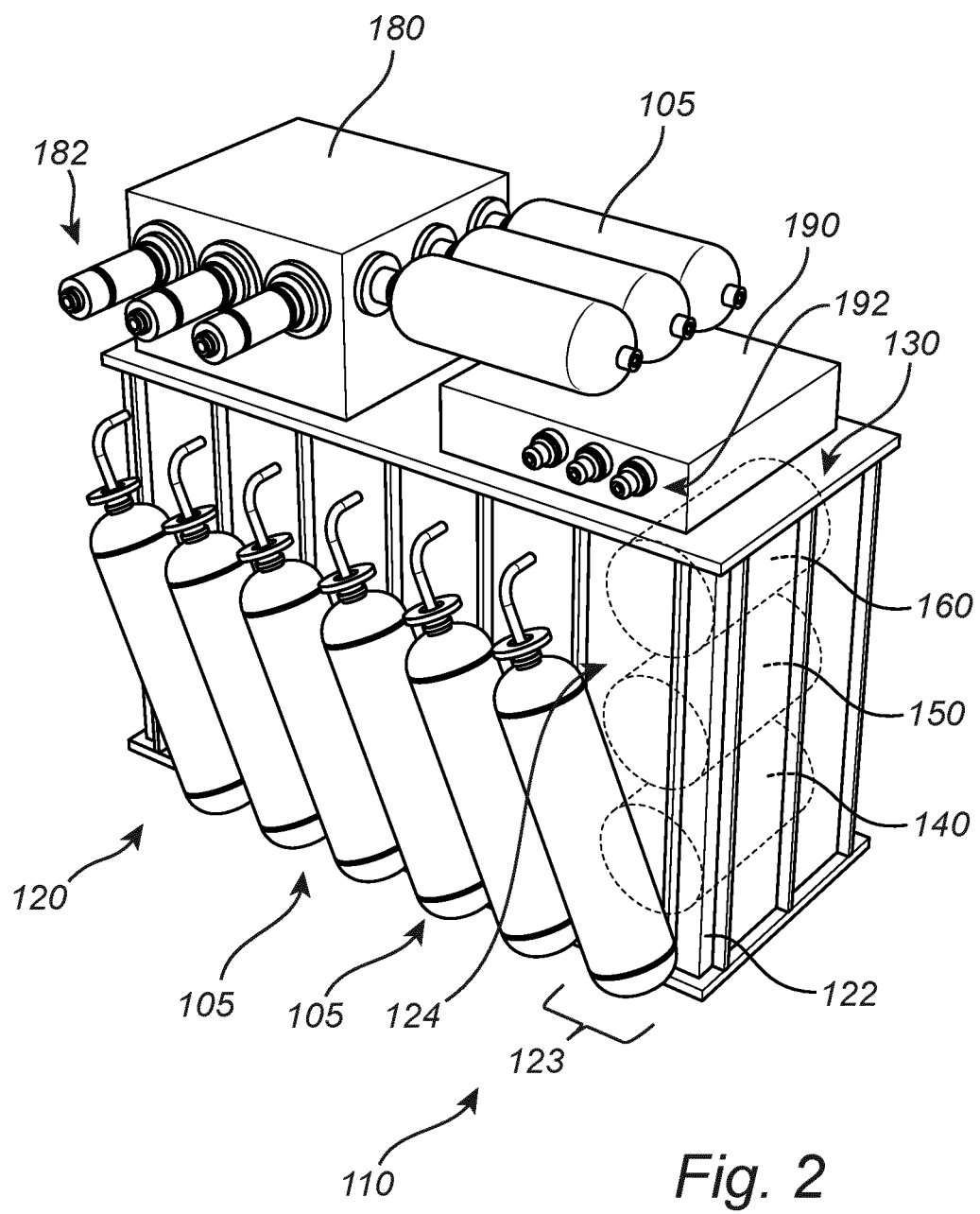
FIG. 2 is perspective view of an UPS arrangement in accordance with at least one embodiment of the invention, FIG. 3A schematically illustrates a power supply system in accordance with at least one embodiment of the invention, FIG. 3B schematically illustrates another power supply system in accordance with at least one embodiment of the invention, FIG. 4 schematically illustrates an UPS module to an example embodiment of the invention.

FIG. 2 is a perspective view of an example UPS arrangement 110 comprising main modules 130 including at least one battery module 140, at least one UPS module 150 and at least one control module 160. In principle the same configuration with regards to the main modules 30 as in FIG. 1 may be used for the main modules 130 in FIG. 2. Thus, the configuration of the main modules 30 and any connections thereof of FIG. 1 may replace the main modules 130 in FIG. 2 (their main functions not being repeated here again). In FIG. 2, the outer enclosure 122 forming an inner space 124 in which at least the main modules 130 are housed is better shown than in FIG. 1. Moreover, the input and output power transformer 180, 190 with the respective outer connectors 182, 192 are arranged outside of the outer enclosure 122. As for FIG. 1, in order vary the number of main modules 130, or at least the number of battery modules 140 and UPS modules 150, as described previously, the outer enclosure 122 is adaptable to vary the size of the inner space 124. For example, the outer enclosure 122 may be made longer as more main modules 130 are added to the UPS arrangement 110, by adding or removing a section 123.

The container 120 of the UPS arrangement 110 may be a standardized container of a predetermined size. The container 120 in FIG. 2 is a pressure compensated container 120, wherein the pressure means is provided by pressure compensators 105. Hereby, the pressure inside and outside of the container 120 may be equalized. The container may be filled with a dielectric fluid (e.g. an incompressible, or almost incompressible, electric isolating and none corrosive medium) e.g. oil. Moreover, each type of the three types of main modules 130, may be a standardized module of a predetermined size and capacity. Thus, each of the main modules 130 may be qualified separately and added based on the desired overall capacity of the UPS arrangement 110.

Figure 3A:
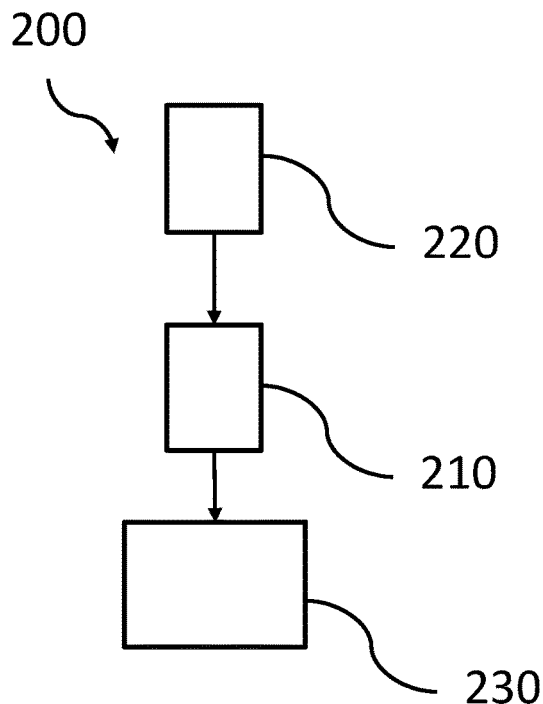

FIG. 3A is a schematic view of a power supply system 200 comprising a UPS arrangement 210, e.g. the UPS arrangement 10 of FIG. 1 or UPS arrangement 110 of FIG. 2, and a main power supply 220 connected to a load 230. Thus, in FIG. 3A, the UPS arrangement 210 and the main power supply 220 are connected in series with the load 230, such that the UPS arrangement 210 during operation is arranged between the main power supply 220 and the load 230 and is at least partly transferring electrical power from the main power supply 220 to the load 230. Hereby, at least a part of the transferred electrical power may be used to charge the battery module(s) of the UPS arrangement 210. Thus, the UPS arrangement 10 of FIG. 1, or UPS arrangement 110 of FIG. 2, may be arranged and configured to be supply the load 230 in parallel with the main power supply 220. This is e.g. embodied by the UPS module(s) 50, 52, 54, 150 and/or configuration of the input and output power transformers 80, 90, 180, 190 of FIGS. 1 and 2.

Figure 3B:
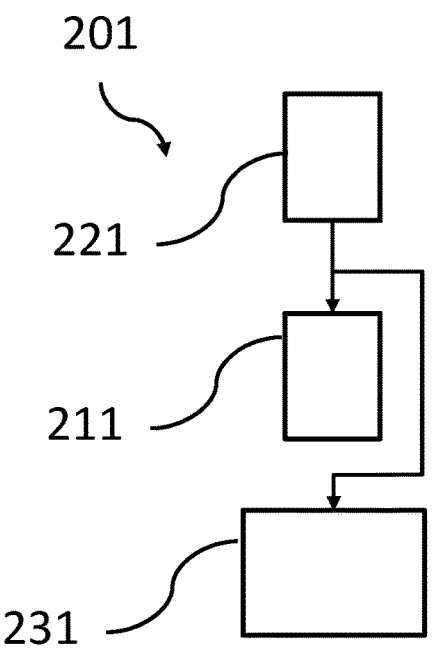

FIG. 3B is a schematic view of an alternative power supply system 201 comprising a UPS arrangement 211 and a main power supply 221 connected to a load 231, e.g. the same load as in FIG. 3A. In FIG. 3B, the UPS arrangement 211 is arranged in a parallel configuration with the main power supply 221 in relation to the load 231. That is, the UPS arrangement 211 is still arranged to be supplied with power from the main power supply 221. e.g. for maintenance charging of the battery and for the supply of control power for internal control functions, but the power to load 231 is bypassed the UPS arrangement. In case of failure of the main power supply 221, the UPS arrangement 211 is automatically change into supplying the load 231 with power (as in FIG. 3A). The UPS arrangement 10 of FIG. 1, or UPS arrangement 110 of FIG. 2, may be used in the power supply system 210 of FIG. 3B as well, e.g. by arranging the UPS module(s) 50, 52, 54, 150 and/or configuration of the input and output power transformers 80, 90, 180, 190 of FIGS. 1 and 2.

Figure 4:
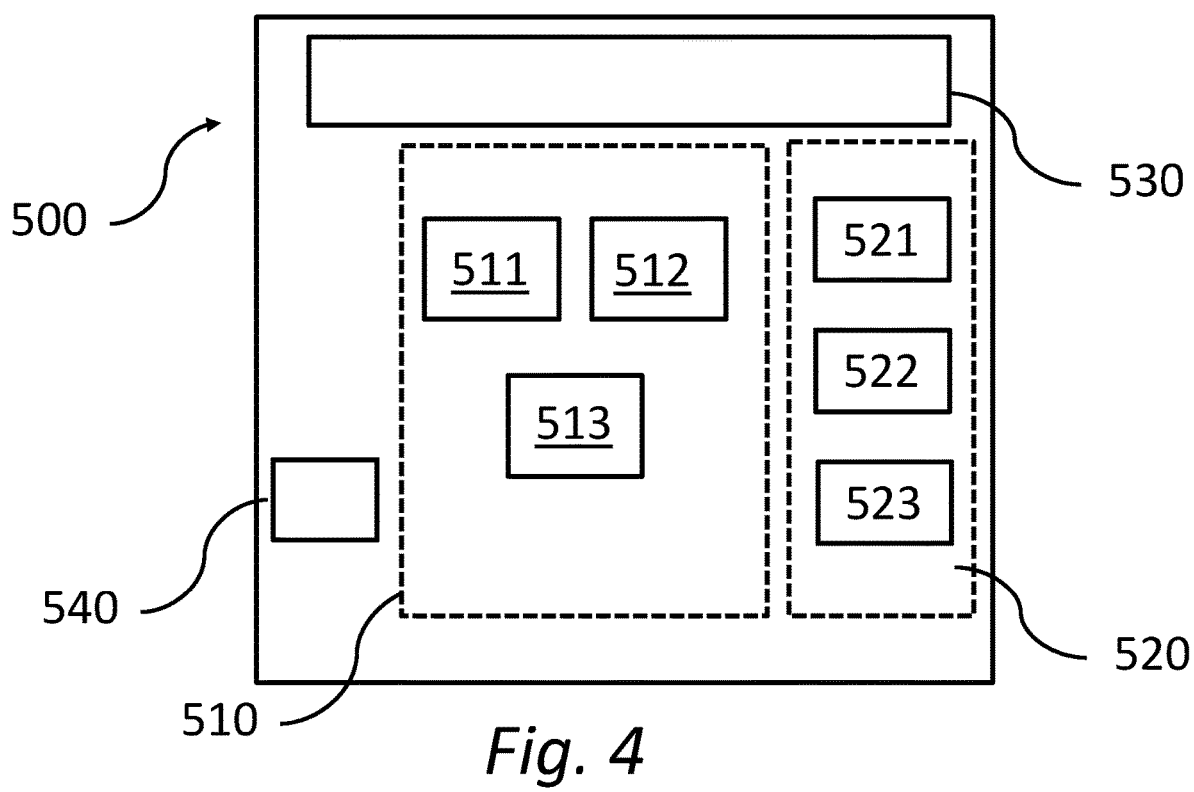

FIG. 4 is a schematic view of an example UPS module 500, which e.g. can be used as one or several of the UPS modules 50, 52, 54 in FIG. 1, or as the UPS module 150 (one or several) of FIG. 2. The UPS module 500 comprises power circuitry 510 for enabling adequate connections and corresponding functionality of the UPS module 500, protection and disconnection circuitry 520, circuitry for parallel supply 530 of load, and connection and control interface 540 for connection with a battery module and control module. Moreover, the power circuitry 510 comprises input converter 511, output converter 512 and battery interface 513. Moreover, protection and disconnection circuitry 520 comprises input protection and disconnect function 521, output protection and disconnect function 522, and battery module protection and disconnect function 523.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An uninterruptible power supply, UPS, arrangement for subsea applications, comprising:
   a container arranged and configured for subsea operation, and the following main modules arranged inside said container:
      at least one battery module of a predetermined battery capacity,
      at least one UPS module governing the at least one battery module, the at least one UPS module having a predetermined UPS capacity, wherein the at least one battery module and the at least one UPS module are each comprised in are respective canister and are physically separated from each other,
      at least one control module configured for interfacing and managing the at least one battery module and the at least one UPS module,
   wherein the UPS arrangement provides a overall capacity that varies based on at least the number of battery and UPS modules, wherein the at least one battery module and the at least one UPS module are internally arranged adjacent to each other such that the heat losses from the at least one UPS module are convectively and/or conductively transferred to the at least one battery module.

2. The UPS arrangement according to claim 1, wherein the main modules are set up in discrete functional groups, each discrete functional group including at least one control module, at least one UPS module and at least one battery module, wherein the UPS arrangement is arranged and configured to vary its overall capacity based on the number of functional groups.

3. The UPS arrangement according to claim 2, wherein at least one battery module, at least one UPS module, or at least one control module is shared between at least two functional groups.

4. The UPS arrangement according to claim 1, wherein the at least one battery module and the at least one UPS module are varied in number separately of each other.

5. The UPS arrangement according to claim 1, wherein the number of battery modules are different to the number of UPS modules.

6. The UPS arrangement according to claim 1, wherein the overall capacity of the UPS arrangement is a UPS-battery capacity, which is defined by a combination of the combined battery capacity of the at least one battery module and the combined UPS capacity of the at least one UPS module.

7. The UPS arrangement according to claim 1, wherein the UPS arrangement is arranged and configured to further vary its overall capacity based on at least the number of control modules.

8. The UPS arrangement according to claim 1, wherein the container comprises an outer enclosure forming an inner space housing at least the main modules, wherein the outer enclosure is adaptable to vary the size of the inner space.

9. The UPS arrangement according to claim 1, wherein the container is a standardized container.

10. The UPS arrangement according to claim 1, being arranged and configured to be connected in series with a main power supply and a load powered by the main power supply.

11. The UPS arrangement according to claim 1, further comprising input and/or output power transformer.

12. The UPS arrangement according to claim 1, wherein the at least one UPS module includes power circuitry including protection and disconnection functionality.

13. A power supply system comprising:
   an uninterruptible power supply, UPS, arrangement for subsea applications, the UPS arrangement comprising:
      a container arranged and configured for subsea operation, and the following main modules arranged inside said container:
         at least one battery module of a predetermined battery capacity,
         at least one UPS module governing the at least one battery module, the at least one UPS module having a predetermined UPS capacity, wherein the at least one battery module and the at least one UPS module are each comprised in a respective canister and are physically separated from each other,
         at least one control module configured for interfacing and managing the at least one battery module and the at least one UPS module,
      wherein the UPS arrangement provides an overall capacity that varies based on at least the number of battery and UPS modules, wherein the at least one battery module and the at least one UPS module are internally arranged adjacent to each other such that the heat losses from the at least one UPS module are convectively and/or conductively transferred to the at least one battery module, and a main power supply connectable to a load.

14. A power supply system according to claim 13, wherein the UPS arrangement and the main power supply are connected in series such that the UPS arrangement, in use, is at least partly transferring electrical energy from the main power supply to the load.

15. The UPS arrangement according to claim 2, wherein the at least one battery module and the at least one UPS module are varied in number separately of each other.

16. The UPS arrangement according to claim 2, wherein the number of battery modules are different to the number of UPS modules.

17. The UPS arrangement according to claim 2, wherein the overall capacity of the UPS arrangement is a UPS-battery capacity, which is defined by a combination of the combined battery capacity of the at least one battery module and the combined UPS capacity of the at least one UPS module.

18. The UPS arrangement according to claim 2, wherein the UPS arrangement is arranged and configured to further vary its overall capacity based on at least the number of control modules.

19. The UPS arrangement according to claim 2, wherein the container comprises an outer enclosure forming an inner space housing at least the main modules, wherein the outer enclosure is adaptable to vary the size of the inner space.

20. The UPS arrangement according to claim 1, wherein the at least one battery module at least partly encloses the at least one UPS module.

21. The UPS arrangement according to claim 1, wherein the canisters of the at least one battery module and the at least one UPS module are each filled with a gas to withstand a subsea environment.

* * * * *